United States Patent Office 3,220,246
Patented Nov. 30, 1965

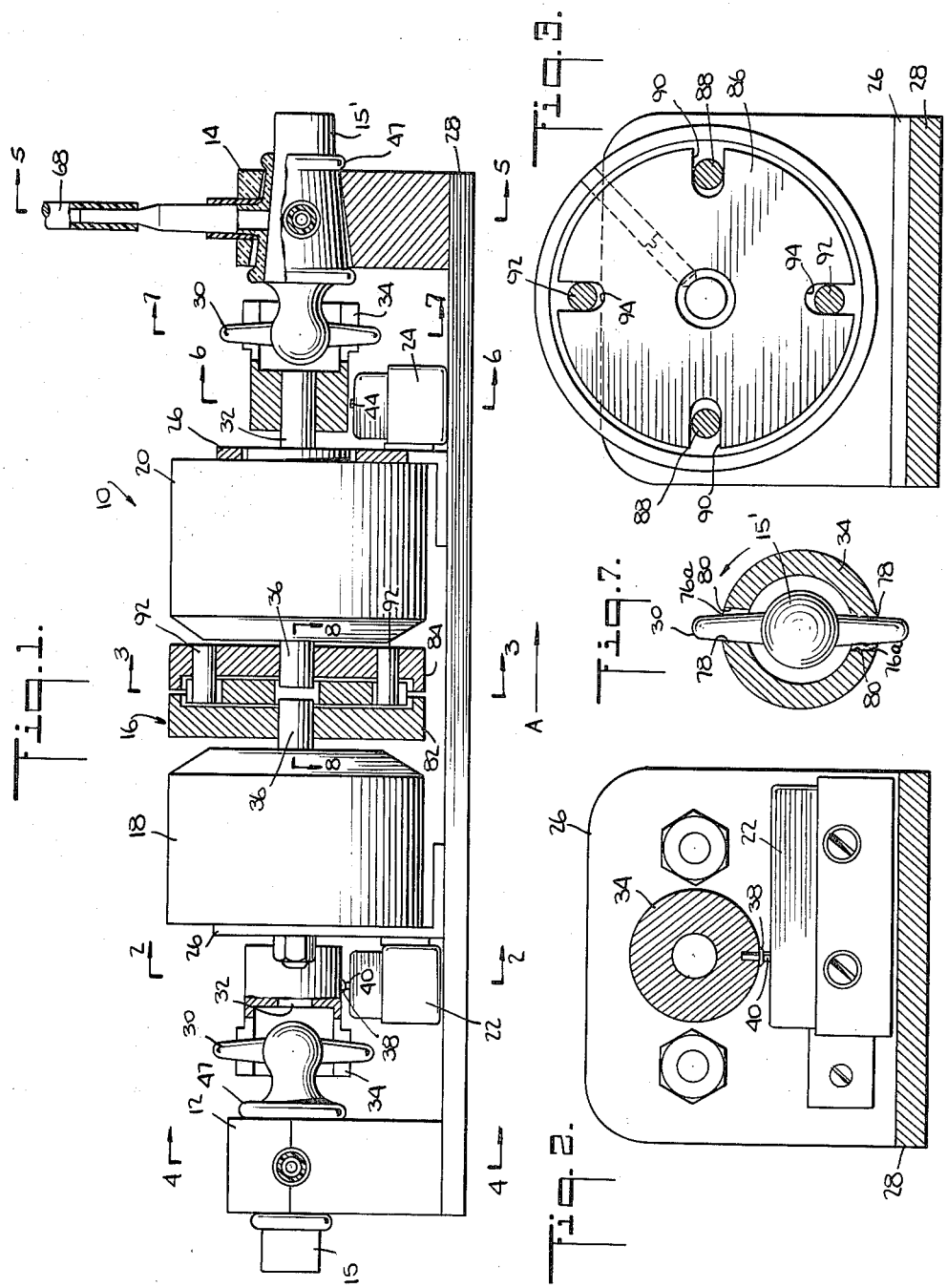

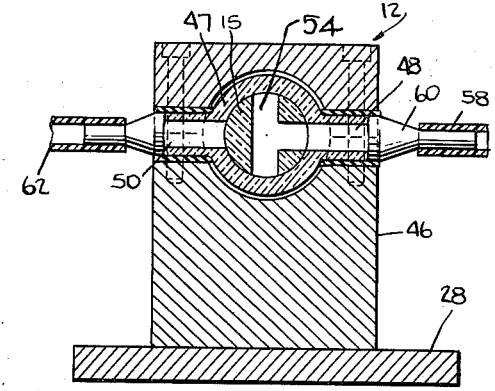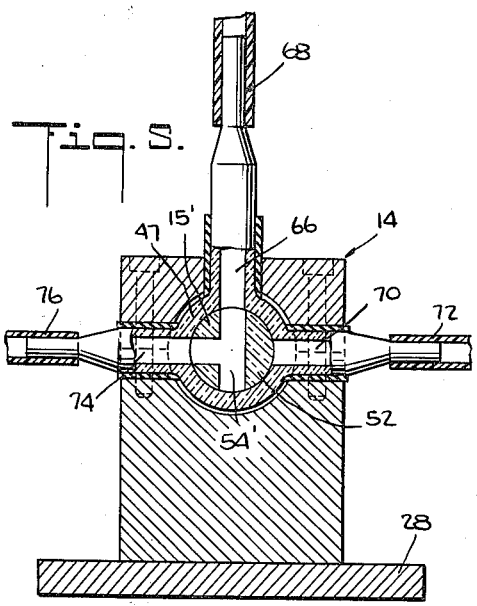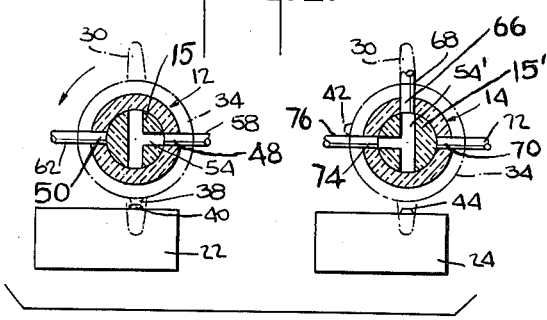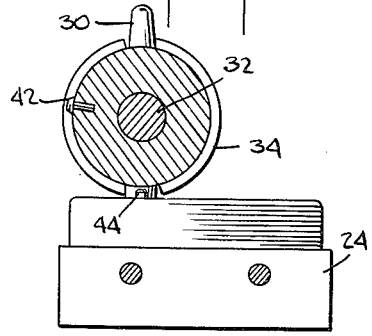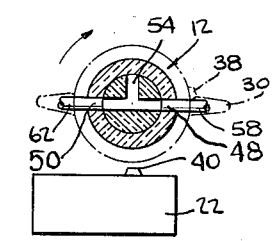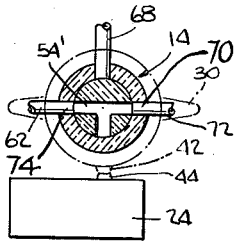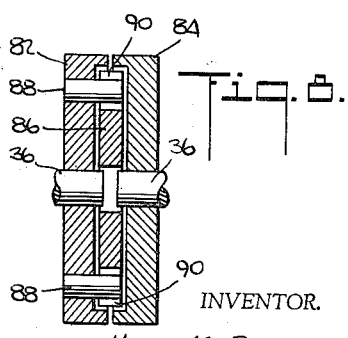

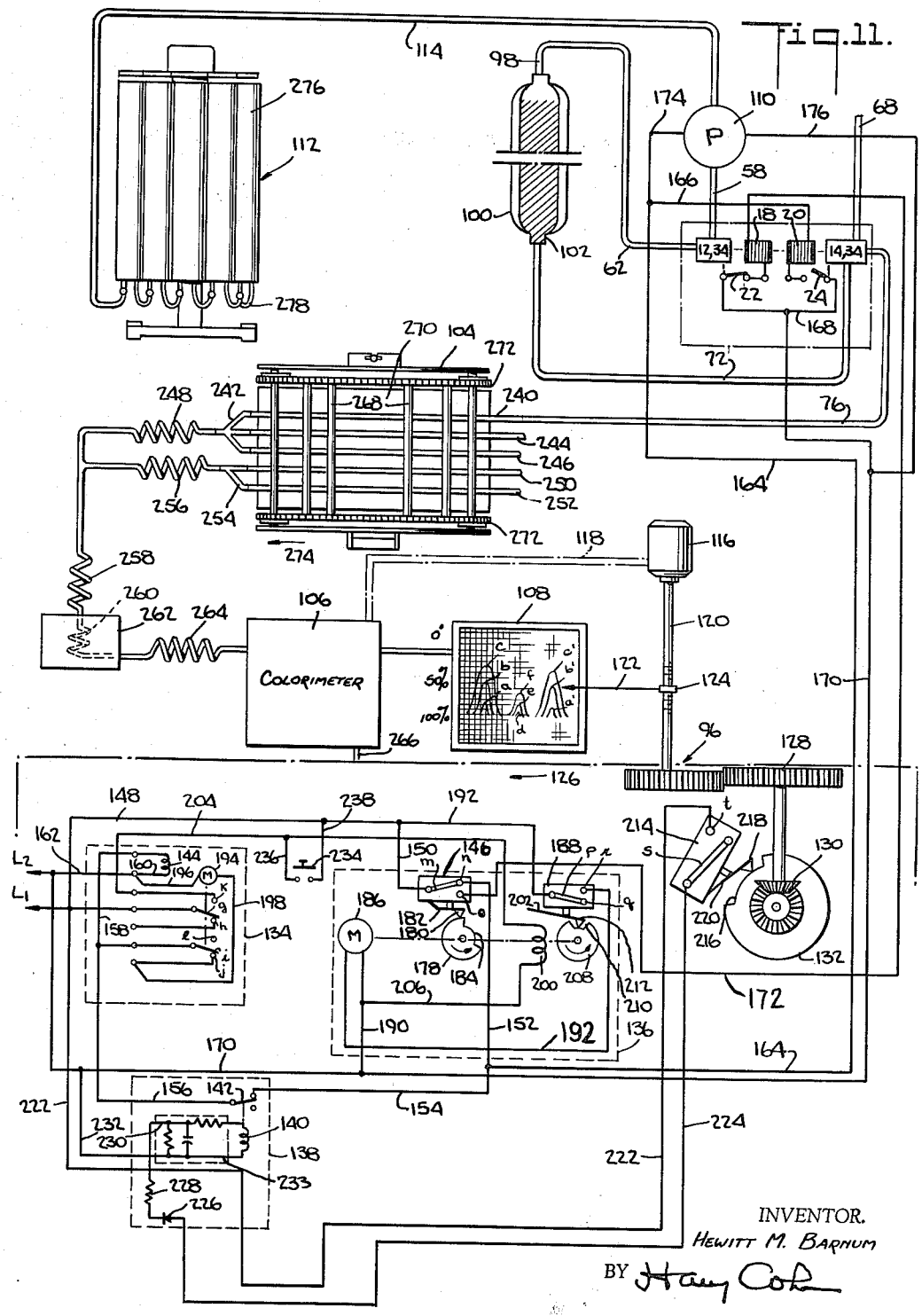

3,220,246
APPARATUS AND DEVICES, ESPECIALLY FOR
CHROMATOGRAPHY ANALYSIS
Hewitt M. Barnum, Rye, N.Y., assignor to Technicon
Chromatography Corporation, Chauncey, N.Y., a corporation of New York
Filed July 13, 1961, Ser. No. 123,872
10 Claims. (Cl. 73—53)

This invention relates to apparatus and devices, especially for use in chromatography analysis.

One of the objects of the present invention is to provide a chromatography analysis apparatus which has provision for standardization operation with improved means for controlling the flow of the standard and other liquids to the apparatus.

Another object is to provide chromatography analysis apparatus of the above indicated type with valve and companion actuating means for controlling the flow of eluent to the chromatography column and eluate from the column and with other valve means for controlling the flow of the standard liquid in lieu of said eluent and eluate for standardization operation of the apparatus in a manner whereby the operation of each valve means is controlled by the other.

A further object is to provide an apparatus for controlling the flow of liquids which is especially well adapted for use with chromatography analysis apparatus having provision for standardization operation.

A further object is the provision of an actuating device of the "rotary solenoid" type wherein the operation of one rotary solenoid participates in the control of the operation of a companion rotary solenoid.

The above and other objects, features and advantages of the invention will be more fully understood from the following description of the presently preferred embodiment of the invention considered in connection with the accompanying drawings which are to be considered as illustrative of the invention and not as limitations thereof.

In the drawings:

FIG. 1 is a side elevational view, partly in section, of a liquid flow control apparatus according to the present invention;

FIG. 2 is a vertical sectional view taken on line 2—2 of FIG. 1;

FIG. 3 is a vertical sectional view taken on line 3—3 of FIG. 1;

FIG. 4 is a vertical sectional view taken on line 4—4 of FIG. 1;

FIG. 5 is a vertical sectional view taken on line 5—5 of FIG. 1;

FIG. 6 is a vertical sectional view taken on line 6—6 of FIG. 1;

FIG. 7 is a vertical sectional view taken on line 7—7 of FIG. 1;

FIG. 8 is a horizontal sectional view taken on line 8—8 of FIG. 1;

FIG. 9 llustrates the positions of the valves during standardization operation of the apparatus;

FIG. 10 illustrates the positions of the valves during analyzing operation of the apparatus; and FIG. 11 is a combined circuit diagram and schematic illustration of a chromatographic analysis apparatus according to the present invention.

Referring now to the drawings in detail and particularly to FIGS. 1 to 10, the liquid flow control apparatus 10 comprises a two-way rotary valve 12 for controlling the flow of one liquid, for example the eluent to the chromatography column, and a three-way rotary valve 14 for controlling the flow of two other liquids, for example the eluate from the column and a standard liquid having a known concentration of a known constituent in lieu of said eluate. The rotary plugs 15, 15' of the valves are connected to each other through a coupling 16, herein shown as an Oldham coupling although any suitable coupling may be used, and rotation of the plug of either valve causes a corresponding rotation of the other. Each valve is operated by a rotary solenoid of the springless type, for example, a Ledex model 7S solenoid which is manufactured by Ledex, Inc. of Dayton, Ohio and it will be understood that rotary movement of the output shaft of the solenoid occurs when the solenoid is energized and when de-energized movement of the solenoid ceases but the solenoid does not return to its initial position since it is of the springless type. As is well known the rotary solenoid includes a rectilinear movable plunger which is operated by an electromagnet and is connected by a suitable mechanism to a rotary shaft. The connecting mechanism is operable to convert the rectilinear movement of the plunger into a rotary motion which operates the rotary shaft. Rotary solenoids of this general type are shown in Leland U.S. Patents Nos. 2,430,940 and 2,496,880.

The solenoid associated with valve 12 is indicated by the reference numeral 18 and the solenoid associated with valve 14 is indicated by the reference numeral 20. A normally closed microswitch 22 is provided for controlling the energization of the associated solenoid 18 and a normally closed microswitch 24 is provided for controlling the energization of the associated solenoid 20. The solenoids are supported on L-shaped brackets 26 which also support the microswitches and the brackets are mounted on a support plate 28 which also supports the valves 12 and 14. The operating handle 30 of each valve, which is connected to the rotary plug of the valve, is connected to one end 32 of the rotary operating shaft of the corresponding solenoid through a connecting member 34 and the opposite end 36 of the operating shaft of each solenoid is connected to the coupling 16.

The solenoids are arranged in confronting relation so they rotate in opposite directions when energized. More particularly, in the position shown which is the position for standardization operation of the chromatography apparatus, solenoid 20 is operable to rotate its rotary shaft in a counterclockwise direction as viewed looking in the direction of arrow A of FIG. 1 to simultaneously rotate valves 12 and 14 from standardizing position into analyzing position of operation of the apparatus. When solenoid 18 is energized, it rotates its operating shaft in an opposite or clockwise direction and rotates valves 12 and 14 back from their analyzing positions to their standardization positions.

This opposite movement of the valves is controlled by the microswitches 22 and 24 which are operable in response to the position of their respective valves. More particularly, the connecting member 34 for valve 12 is provided with a switch actuating button 38 which contacts the operating button 40 of microswitch 22 to open said microswitch when the apparatus is in standardization condition of operation. The connecting member 34 for valve 14 is provided with a switch actuating button 42 (FIG. 6) which is displaced 95° from button 38 in a clockwise direction as viewed looking in the direction of arrow A of FIG. 1 so that in standardization position of the apparatus, microswitch 24 is closed because button 42 is not in contact with the operating button 44 of said switch. In other words, during standardization switch 22 is open and switch 24 is closed and the switches are in opposite conditions during analyzing operation, i.e., switch 22 is closed and switch 24 is open.

The energization current for the solenoids is supplied from a control circuit (FIG. 11) which includes timing devices as will be more fully understood hereinafter.

At the completion of the standardization period of operation of the apparatus, current is supplied to solenoid 20 through its closed switch 24 which results in the simultaneous rotation of valves 12 and 14 in a counterclockwise direction, as viewed in FIGS. 9 and 10 from the positions shown in FIG. 9 which are the standardization positions of the valves, to the positions shown in FIG. 10, which are the analyzing positions of the valves. In this analyzing position, button 42 contacts the operating button 44 of microswitch 24 to open said switch and thereby opens the energization circuit to solenoid 20 to stop the rotation of valves 12 and 14. Upon the initial rotation of solenoid 20, it will be observed that button 38 disengages button 40 of microswitch 22 to close said microswitch but a circuit is not completed to solenoid 18 because the control circuit associated with microswitch 22 remains open. Upon de-energization of solenoid 20 when contact between buttons 42 and 44 is made, the rotation of the valves stop and the apparatus is in condition for analyzing operation.

At the conclusion of the analyzing period, which is under the control of the previously mentioned control circuit (FIG. 11), said circuit completes an energization circuit to solenoid 18 through closed microswitch 22 which causes the operating shaft of said solenoid to rotate in a clockwise direction, as viewed in FIGS. 9 and 10, which rotates valves 12 and 14 back from their analyzing positions to their standardizations positions and in said standardization positions, buttons 38 and 40 are engaged so that switch 22 opens and thereby opens the energization circuit to solenoid 18 which stops the rotation of the valves. During the initial rotation of the operating shaft of solenoid 18, buttons 42 and 44 are disengaged to close microswitch 24 but a circuit is not completed to solenoid 20 because the control circuit for said solenoid remains open until the end of the standardization period, at which time it closes to move the valves again into analyzing positions.

As best seen in FIG. 4, two-way valve 12 comprises a valve body 46 which supports a stationary sleeve 47 and each is provided with an inlet passage 48 and an outlet passage 50. The rotary valve plug 15 is mounted for rotation in the sleeve 47 of the valve body and is provided with the T-shaped passage 54. As best seen in FIGS. 4 and 9, in the standardization position of the valve the outlet 50 is blocked so that no liquid flows through the valve. Valve 12 controls the flow of eluent to the chromatography column and in the standardization position of operation of the apparatus, valve 12 prevents the flow of eluent to the column. One end of a conduit 58 is connected to a suitable source of the eluent and the other end of the conduit is connected to the nipple 60 which extends from the inlet 48 of the valve. The outlet passage 50 of the valve is provided with a similar nipple and one end of a conduit 62 is connected to said passage and the other end of the conduit is connected to the inlet opening at the top of the chromatography column (FIG. 11). When the plug 15 is rotated in a counterclockwise direction, as viewed in FIGS. 4 and 9, passage 54 connects inlet passage 48 to outlet passage 50 to permit the flow of eluent through the valve to the inlet opening of the column for analyzing operation of the apparatus.

Valve 14 (FIG. 5) is similar to valve 12 but is provided with an additional inlet passage 66 which is connected to a conduit 68 that supplies a standard liquid having a known constituent to the chromatographic analysis apparatus for standardization operation of said apparatus. The inlet passage 70 of the valve is connected to the outlet opening of the chromtography column by a conduit 72 for transmitting eluate from the column to the valve (FIG. 11). The outlet passage 74 of the valve is connected to the chromatographic analysis apparatus through a conduit 76 so that standard liquid or eluate is transmitted to the analysis apparatus through said conduit 76.

As best seen in FIGS. 4 and 9, in the standardization position of valve 14, the passage 54' of the rotary plug 15' connects inlet 66 to outlet 74 so that standard liquid is transmitted through the valve. In the analyzing position of the valve, as shown in FIG. 10, the passage 54' connects inlet passage 70 to outlet passage 74 to permit the flow of eluate from the column through the valve to the analysis apparatus.

The connecting members 34 are identical in construction and each includes a slot 76a in which the operating handle 30 of the valve is positioned. The sides of the slot are slightly wider than the width of the corresponding portion of the handle 30 and it is to be noted from FIG. 7 that at each corresponding portion of the handle one side 78 of the slot is in contact with one side of the handle and the opposite side 80 of the slot is spaced from the other side of the handle. The space corresponds to a rotational movement of 5° of member 34. When solenoid 20 is energized it causes the members 34 to rotate in a counterclockwise direction as viewed in FIG. 7 and during movement of the members through an initial 5° of rotation, members 34 do not engage the handle so that the plug is not rotated during initial rotation of the solenoids. Since the starting torque of the solenoid is relatively weak, said starting torque is not relied on to rotate the plug of the valve and after the torque of the solenoid has increased, i.e., after 5° of rotation, then sides 80 of the slot 76a engage the handle of the valve to rotate the valve 90° and at the end of said rotation the corresponding microswitch for the energized solenoid is actuated to open the circuit to said solenoid and stop the rotation thereof. At this time sides 78 of slot 76a are spaced from the sides of the handle an amount equal to 5° of rotation and upon subsequent energization of solenoid 18, members 34 rotate in an opposite direction, or in a clockwise direction as viewed in FIG. 7, and no rotation of the valve occurs until sides 78 move through 5° of rotation, at which time said sides contact the corresponding sides of the handle.

Coupling 16 comprises two confronting plates 82 and 84 and each plate is connected to an end 36 of the operating shaft of the adjacent solenoid. The plates are connected to each other through an intermediate plate 86 by a series of pins. A pair of aligned pins 88 is connected to plate 82 and extends from said plate into a pair of corresponding aligned slots 90 provided in the intermediate plate 86 and another pair of aligned pins 92, which are at right angles to pins 88, extends from plate 84 into a pair of corresponding aligned slots 94 provided in the intermediate plate 86, said slots 94 being at right angles to slots 90. It will be apparent that the arrangement of the plates, pins and slots compensate for any misalignment between the operating shafts of the solenoids.

The control of the standardization operation of the chromatography analysis apparatus will now be more fully explained with respect to FIG. 11 which illustrates an electric circuit 96 which is operable to periodically interrupt the eluate analyzing operation of the apparatus and to introduce the standard liquid having a known constituent of known concentration into the apparatus for a standardization operation of the apparatus to determine whether the apparatus is operating properly and this is done in a manner which avoids interference with the recording of the results of the eluate examination. Control circuit 96 is the invention of Milton H. Pelavin and is described in his copending application, Serial No. 123,-721 filed July 13, 1961, now Patent No. 3,166,929 which is assigned to the assignee of the present application and which is filed concurrently herewith. As shown in FIG. 11, the circuit is in analyzing operating position wherein valves 12 and 14 are in the positions shown in FIG. 10 so that eluent is flowing through valve 12 to the inlet opening 98 of the chromatography column 100 and eluate is flowing through the outlet 102 of the column through valve 14 to the analyzing part of the apparatus. As previously indicated, in the eluate analyzing condition of the apparatus, microswitch 22 is closed and microswitch 24 is open.

The apparatus includes a proportioning pump 104, a colorimeter 106 of the flow cuvette type and a multi-point recorder 108 operable under the control of the colorimeter for recording the results of the colorimetric analysis of the liquid. The apparatus is of the continuous flow type wherein a pump 110 transmits a stream of the eluent to the inlet opening 98 at the top of the column 100 and the eluent flows downwardly through the column for eluting the various zones of the chromatogram and the resulting eluate is concurrently transmitted from the outlet opening 102 at the bottom of the column, by the aspirating action of pump 104, and is treated for colorimetric analysis, as will be explained more in detail hereinafter. The eluent may be supplied to pump 110 from any convenient source but, as shown herein, it is preferable that the eluent be supplied from a variable gradient device 112 so that the concentration of the eluent varies in a continuous manner to improve the resolution of the various zones of the chromatogram. From the variable gradient device the eluent of continually changing concentrations is transmitted to the pump 110 via conduit 114.

In accordance with the invention, the eluate examining operation of the apparatus is periodically interrupted, the flow of eluent to the column and the flow of eluate from the column being interrupted by moving valves 12 and 14 from their eluate examining positions shown in FIG. 10 to their standardization position shown in FIG. 9. This action stops the flow of eluent to the column and stops the flow of eluate from the column and simultaneously permits the transmission of the standard liquid through valve 14 to the apparatus in lieu of said eluate for standardization operation of the apparatus to provide a series of light transmittance curves representing the concentration of the known constituent of the standard liquid. If the apparatus is operating properly, the resulting curves from standardization operation should indicate the same light transmittance values versus concentrations previously established for the apparatus with respect to the standard liquid. If the resulting curves differ from those previously established, it indicates that the apparatus should be recalibrated or adjusted. For example, if the results of the standardization operation provide light transmittance curves which differ from those formed during an earlier standardization operation, then the technician or operator is informed that the apparatus is operating improperly and can determine if the apparatus should be recalibrated or adjusted. In accordance with an important feature of the invention, the eluate examining operation is not interrupted unless the stylus of the recorder is at or near the base line as indicated on the recorder chart paper. This prevents interruption of the eluate examining period when examination of the eluent from a zone of the chromatrogram has begun and has not ended, as will be more fully understood hereinafter.

The eluate curves are indicated on the chart paper of recorder 108 by the letters a, b and c and a', b' and c' and the standard curves resulting from the colorimetric examination of the standard liquid are indicated by the letters d, e and f. It is to be noted that the eluate curves are separated from each other by the standard curves and it will be understood that the eluate curves a, b and c represent the constituents or characteristics of the eluate from one zone of the chromatogram and the eluate curves a', b' and c' represent the constituents or characteristics of the eluate of a succeeding zone which is eluted from the chromatography column. Three curves are shown for each eluate since the eluate is preferably examined by the colorimeter by light of two different wave lengths, each passing through a light path for the liquid which is of the same length as the other light path, and by light of the same wave length as one of said wave lengths but which passes through a light path which is longer than the other light paths. This is in accordance with known practice so that records of the different characteristics of the eluate are formed on the recorder as a result of the flow of the eluate through the colorimeter 106. In the case of the standard liquid having one constituent only, the three curves d, e and f result from the colorimetric examination of said constituent in the same manner as the colorimetric examination of the eluate. The multi-point recorder 108 is a well known type of recorder and is not, per se, part of the invention and, therefore, does not require further description.

The colorimeter is of a well known type and includes photo-electric devices which are responsive to the light absorption characteristics of the liquid being examined and provide voltages whose differences are effective to control the operation of a null-type balancing electric circuit (not shown) of the recorder 108 to drive the motor 116 of the recorder. The operative connection between the colorimeter and the recorder motor is indicated by the broken lines 118 and the motor drives a rotary threaded shaft 120 for operating the stylus 122 of the recorder. The stylus is secured to a nut 124 which is prevented from rotation so that rotation of the shaft 120 causes longitudinal movement of the nut 124 along the length of the shaft to provide transverse movement of the stylus 122 relative to the chart paper of the recorder which is moving in the direction indicated by the arrow 126. Since the recorder is of the multi-point type, the stylus does not print on the recorder chart paper as it moves transversely to its printing position but at said printing position the stylus is actuated by a suitable mechanism and prints on the chart paper. In this manner a plurality of curves representing different characteristics of the liquid are simultaneously recorded on the chart paper.

The shaft 120 is operatively connected by the spur gears 128 and bevel gears 130 to a rotary cam 132 which is movable in response to the movement of the stylus 122 of the recorder for controlling the operation of control circuit 96 so that interruption of the examination of the eluate for standardization operation is prevented if the examination of the eluate has begun and has not ended, as will be more fully understood hereinafter.

The control circuit 96 of the apparatus is shown in its normal eluate examining condition wherein valves 12 and 14 are in the position shown in FIG. 10 and eluent is being transmitted to the chromatography column 100 and eluate is being aspirated from said column by the action of pump 104 for examination of said eluate. The control circuit comprises a timer 134 for controlling the eluate examining period of operation of the apparatus and a timer 136 for controlling the period of standardization operation of the apparatus. Any suitable timers may be used. As here shown, timer 134 is preferably a Model HP–5 timer manufactured by the Eagle Signal Company of Moline, Ill. and timer 136 is preferably a RC series timer of the single cycle multi-cam type manufactured by the Industrial Timer Corporation of Newark, N.J., and only certain parts of each of the timers are illustrated herein, since the omitted parts are not necessary for describing the invention. Timers 134 and 136 are effective to provide spaced periods of eluate examining operation of the apparatus during spaced intervals of time and spaced period of standardization operation between said spaced time intervals. The circuit 96 also includes a timer control circuit 138 which includes a relay 140 that operates a control switch 142 for timer 134. Switch 142 is normally closed during timing operation of timer 134 and when it opens the timer is automatically moved into its reset condition wherein movable contact g closes contact h and movable contact i closes contact j which are the same positions of said contacts during timing operation of the timer. In the timed-out condition of timer 134, movable contact g closes contact k and opens contact h and movable contact i closes contact l and opens contact j. Closing switch 142, after it has been opened to reset the timer, initiates timing operation of the timer.

The power lines for the control circuit 96 are indicated at L1 and L2, and will be observed that opening of switch 142 results in the loss of power to the clutch coil 144 of timer 134 to reset said timer and it is to be understood that loss of power to the clutch coil is always operative to reset the timer. Loss of power to the clutch coil can also be caused by the operation of timer 136 since said timer includes a movable contact m of a microswitch 146 which is included in the circuit that includes switch 142, said circuit comprising line L1, lead 148, lead 150, switch 146, lead 152, lead 154, switch 142, lead 156, lead 158, clutch coil 144, leads 160 and 162, and line L2.

The operation of control circuit 96 and the other components thereof will now be explained in further detail. As indicated previously, the circuit is shown in eluate examination condition wherein both solenoids 18 and 20 are de-energized and switch 22 is closed while switch 24 is open. The circuit to the switch 24 and its corresponding rotary solenoid 20 can be traced as follows: Line L1, lead 148, lead 150, switch 146 of timer 136, lead 152, lead 164, lead 166, solenoid 20, open switch 24, lead 168, lead 170 and line L2. Thus it is seen that with respect to solenoid 20, while the timing circuit is completed to said solenoid through closed contacts m and n of switch 146, as shown, the solenoid is de-energized because its operating microswitch 24 is open. The circuit to solenoid 18 and its control switch 22 can be traced as follows: Line L1, lead 148, lead 150, through open contacts m and o of switch 146, lead 172, solenoid 18 and closed microswitch 22, lead 168, lead 170, and line L2. Thus it is seen that while switch 22 is closed to permit current to flow to its associated solenoid 18, solenoid 18 remains de-energized because the timing circuit to said solenoid is open at contacts m and o of switch 146.

Pump 110 is energized in the eluate examining position of the apparatus since the pump is connected to leads 164 and 170 via leads 174 and 176, respectively. The operation of the pump is effective to pump the eluent, as previously indicated.

The position of movable contact m of switch 146 controls the energization of the solenoids and the operation of said movable contact is controlled by the cam 178 of timer 136. In the position shown, the contact part 180 of actuating arm 182 of the switch engages the peripheral edge of the cam and when said part falls into the cutout 184 of the cam, contact m is moved and engages contact o to complete an energization circuit to solenoid 18 which rotates the valves into position (FIG. 9) to commence standardization operation of the apparatus and simultaneously opens the circuit to solenoid 20 so that upon initial movement of said solenoid due to the movement of solenoid 18, said solenoid 20 is not energized even though initial movement closes switch 24, because of the open contacts m and n. Cam 178 is connected to the shaft of the timing motor 186 of timer 136 and during eluate examining operation of the apparatus, said motor is de-energized since its operation is controlled by the microswitch 188 of timer 136. In the de-energized condition of timer 136, movable contact p of switch 188 closes contact q and opens contact r of the switch whereby the energizing circuit for the motor through line L2, lead 170, lead 190, motor 186, lead 192, open contact r of switch 188, lead 192, lead 148, and line L1 is open.

In the position shown, motor 194 of timer 134 is energized and is operating the timer through an energization circuit comprising line L2, lead 162, lead 196, motor 194, lead 198, closed contacts i and j, lead 156, closed switch 142, leads 154 and 152, closed contacts m and n of switch 146, leads 150 and 148, and line L1. It is to be noted that if switch 142 opens or if contacts m and n of switch 146 of timer 136 open, the energization circuit to timer motor 194 opens to stop the timing operation of timer 134 and the timer is automatically moved into reset condition.

Relay 200 of timer 136, which controls the operation of actuating arm 202 of switch 188, is de-energized during timing operation of timer 134 because of open contact k of said timer so that contacts p and q of switch 188 are closed. The energization circuit for relay 200 comprises line L1, contacts g and k of timer 134, lead 204, relay 200, lead 206, lead 190, lead 170 and line L2. Energization of relay 200 starts the operation of timer 136 because upon energization, the relay actuates arm 202 causing the closing of contacts p and r of switch 188 which completes an energization circuit to the timer motor 186, in the manner previously indicated. Subsequent loss of power to relay 200 after energization of motor 186 doesn't result in the de-energization of said motor because of the disc cam 208 which is connected to the shaft of the motor. Cam 208 includes a cutout portion 210 which is engaged by contact part 212 of arm 202 when the relay 200 is de-energized and the cam is in the position shown. Upon energization of the relay, part 212 is caused to move out of said cutout and rotation of cam 208 due to the operation of motor 186 moves the cutout away from the position of part 212 so that upon de-energization of relay 200 said part engages the peripheral edge of the cam which prevents the opening of contact r of switch 188 until cam 208 makes a complete revolution to return cutout 210 to the position shown. In said position, part 212 moves into cutout 210 and opens contact r and simultaneously closes contact q to end the operating period of timer 136. The length of the timing period of timer 136 must always be less than the length of the timing period of timer 134 so that timer 136 is always in condition to start the timing of the standardization operating period of the apparatus at the conclusion of the eluate examining period which is controlled by timer 134.

The energization of relay 140 which controls the position of switch 142 is controlled by the cam 132 that is operatively connected to the stylus 122 of the recorder by the gears 128 and 130 and is movable in response to the movement of said stylus. The cam controls the operation of a microswitch 214 and has a cutout portion 216 in which extends the cam engaging part 218 of the actuating arm 220 of the switch when the position of the stylus 122 of the recorder is close to the base line of the recorder, which represents the 100% light transmittance value or the position of the stylus is at a light transmittance value which is above a predetermined value, for example 85% or higher, or in a range from 85% to 100%. This range of light transmittance values corresponds to the values which occur near the beginning and end of an examination of the eluate from a zone of the chromatogram. In other words, portion 216 of the cam corresponds to the positions of the stylus which are about between 85% to 100% light transmittance values, as indicated on the recorder chart paper. In these positions of the stylus, movable contact s of switch 214 is in the position shown and stationary contact t of the switch is open so that relay 140 is de-energized and switch 142 is closed because the energization circuit for relay 140 is open. Said circuit can be traced as follows: Line L1, lead 222, switch 214, lead 224, rectifier 226, resistance 228, lead 230, relay 140, leads 232 and 170, and line L2.

With the stylus of the recorder between 85% to 100% light transmittance values so that relay 140 is de-energized, the circuit is in condition to begin standardization operation of the apparatus as soon as timer 134, which controls the eluate examining period, moves into its timed-out condition. Standardization operation cannot occur at the end of an eluate examining period if the position of the stylus is below the 85% light transmittance value which indicates that eluate is being examined. This prevents interruption of the examination of the eluate from a zone of the chromatogram when its examination has begun and has not yet been completed. Since it is difficult to know in advance the periods during which the eluate from the various zones of the chromatogram pass through the colorimeter, the control circuit 96 prevents the start of a period of standardizing operation of the apparatus when the eluate from a zone is passing through the colorimeter. In this way, there is no interruption of the examination of the eluate from the chromatography column for standardization and the standard curves resulting from standardization operation of the apparatus are positioned on the recorder chart paper, as shown, so that they do not interfere with the curves resulting from the examination of the eluate.

At the conclusion of the eluate examining period as set by the timer 134, the timer is in its timed-out condition and contacts i and j are open. Opening of contacts i and j opens the energization circuit to timer motor 194 and stops the timing operation of the motor. The simultaneous closing of contacts g and k completes the energization circuit through relay 200 which causes the closing of contacts p and r of switch 188 of timer 136. This energizes timer motor 186 of timer 136 and starts the operation of the timer for timing the standardization operation of the apparatus. Rotation of motor 186 moves the cutout portion 184 of cam 178 into position to receive the cam engaging part 180 of arm 182 of switch 146 causing the closing of contacts m and o and the opening of contacts m and n of said switch which results in the de-energization of motor 110 to stop the pumping of the eluent and in the energization of solenoid 18 so that valves 12 and 14 simultaneously move into position for standardization operation as shown in FIG. 9. In this position the flow of eluent and eluate are prevented and concurrently the flow of the standard liquid through the colorimeter is commenced for standardization operation. In the standardization position of the valves, switch 22 is open and switch 24 is closed, as previously explained.

As soon as cutout portion 184 of cam 178 moves away from the position of the cam engaging part 180, contacts m and o open and contacts m and n close to complete an energization circuit to solenoid 20 through closed microswitch 24 whereby the valves are actuated to stop the flow of standard liquid to the colorimeter and simultaneously commence the flow of eluent to the column and the flow of eluate in lieu of said standard liquid to the analysis part of the apparatus. However, motor 186 of timer 136 continues to rotate since once energized it does not stop rotating until it completes one revolution because of cam 208. Different cams 178 may be provided to provide different lengths of periods of standardization operation since it is to be understood that the length of the period of standardization is controlled by the cutout portion 184 of cam 178.

As indicated previously, opening of contacts m and n of switch 146 results in the de-energization of clutch coil 144 of timer 134 and simultaneously with the closing of contacts m and o to commence the flow of standard liquid to the apparatus, timer 134 is reset. In the reset condition of the timer, contacts g and h are closed and contacts i and j are also closed so that relay 200 is de-energized because of open contacts g and k. However, by this time cutout portion 210 of cam 208 has moved from the position shown and part 212 of arm 202 of switch 188 engages the edge of the cam and the opening of contacts p and r is presented even though relay 200 is de-energized. Timer motor 194 of timer 134 is not energized because its energization circuit is open because of open contacts m and n of timer 136. When these contacts are again closed by the action of cam 178, timer 134 commences its timing cycle for the eluate examining period of operation of the apparatus.

In the event that at the end of a period of eluate examining operation of the apparatus, when timer 134 is in its de-energized condition, and the position of the stylus 112 is at a light transmittance value which is less than 85%, then switch 142 is open because of the energization of relay 140 caused by the position of cam 132. The open switch 142 resets the timer so that contacts g and k are open in this de-energized condition of the timer since this is also the reset position of said contacts and, as previously explained, loss of power to the clutch coil 144 of the timer due to the opening of switch 142 causes timer 134 to automatically move into its reset position. Therefore, relay 200 of timer 136 is not energized, the standardization period of operation does not begin, and solenoid 18 is not energized to move the valves from their eluate examining position to standardization position and the examination of the eluate continues without interruption. When the stylus of the recorder moves to the 85% value, switch 142 closes and another eluate examining period begins. It is to be observed that if switch 142 is open at the end of an eluate examining period, timer 136 is not actuated to commence the standardization period of operation and another timed eluate examining period starts upon closing of switch 142 due to de-energization of relay 140.

When the eluate examining period begins, the stylus of the recorder is at the base line which is at the 100% light transmittance value and as eluate continues to pass through the colorimeter the stylus moves to lower light transmittance values to form the ascending portions of the light transmittance curves. When the stylus of the recorder passes the 85% light transmittance value, switch 142 of timer 134 opens to stop the timing operation of the timer and the timer moves into its reset position. Eluate continues to flow through the colorimeter and the stylus of the recorder will continue to ascend to a peak value and then descend to form the descending portions of the curves and when the stylus moves past the 85% light transmittance value switch 142 is closed to begin a period of operation of timer 134. It is to be noted that the major portions of the curves which indicate light transmittance value of 85% and less are formed during inoperation of timer 134. Since timer 134 is not timing during the major part of the eluate examining period, this lessens the necessity of precise determinations for the settings of said timer and this is especially noteworthy since the exact time required for eluting a zone of the chromatogram is not generally known ahead of time.

Timer 134 continues to operate and complete its timing cycle and during this timing cycle the remaining portions of the eluate pass through the colorimeter so that the stylus of the recorder returns to the 100% light transmittance value position or the base line of the recorder. At this time the eluate examining period has ended and the standard liquid is introduced into the apparatus while the stylus is at the base line or close to it. This avoids any possible interference of the standard curves with the curves resulting from the examination of the eluate and there is no overlapping of the standard curves with said eluate curves.

It will be recalled that recorder 108 is of the multi-point type wherein stylus 122 moves back and forth transversely of the recorder chart paper so that near the 100% light transmittance value the stylus will move above and below said value for a short interval as it prints various portions of the different curves. In order to avoid chattering of switch 142 due to the alternate energization and de-energization of relay 140, a time delay circuit 233 is provided in the circuit of the relay 140. The components of the time-delay circuit are such as to prevent energization or de-energization of the relay for a predetermined timed interval even though the circuit to the relay is closed due to the back and forth movement of the stylus in the vicinity of the 85% light transmittance value.

If it is desired or necessary to interrupt eluate examining operation and begin standardization operation, switch 234 may be momentarily closed to complete an energization circuit to relay 200 via leads 236 and 238.

The present invention is not specifically concerned with any particular analysis with respect to the chemistry thereof, but, on the contrary, relates broadly to continuous chromatographic analysis of various eluates from a chromatography column. While it will be apparent to those skilled in the art that the apparatus is well adapted for chromatographic analysis of many substances, the apparatus is especially well adapted for analysis of amino acids. In the operation of the apparatus for amino acids analysis, after the chromatography column 100 has been prepared in accordance with well known practice, the apparatus is operated for stripping the column. For this purpose the pump 110 is operated to supply the eluent to the inlet 98 of the column and in the case of amino acids the eluent is a well known buffer of suitable pH. The eluate flows from the column through its outlet 102 and is aspirated by the action of proportioning pump 104 through conduit 76 and pump tube 240 to a fitting 242 where the eluate stream mixes with air or other inert gas, supplied through pump tube 244, and a suitable diluent liquid supplied through pump tube 246 to form a segmented stream consisting of a series of liquid segments containing diluted eluate separated from each other by a series of intervening segments of air. A suitable diluent liquid, in the case of amino acid analysis, is methyl cellosolve. The air segments serve to cleanse the various tubular passages of the apparatus.

From fitting 242 the segmented eluate stream passes through a horizontal helical mixing coil 248 wherein the constituents of each liquid segment are mixed together. Concurrently with the transmission of the eluate through pump tube 240, suitable color producing reagents for treating the eluate for colorimetric examination are transmitted through pump tubes 250 and 252, respectively. In the case of amino acid analysis, the color reagent is ninhydrin which is supplied through pump tube 250 and hydrindantin which is a reducing agent and is supplied through pump tube 252. The ninhydrin and hydrindantin join each other in fitting 254 and are mixed together in helical mixing coil 256 and from said mixing coil the color reagent stream joins the segmented eluate stream and the color reagent liquid is mixed with the diluted eluate segments of the stream in horizontal helical mixing coil 258. From mixing coil 258 the stream is passed through the coil 260 which is immersed in the liquid of a heating bath 262 for developing the color and it will be understood that the intensity of the color is a measurement of the quantity of the constituent present in the eluate. The stream is then cooled in the air cooled coil 264 and is transmitted to the flow cuvette of the colorimeter 106 for colorimetric analysis. The examined liquid is discharged from the colorimeter through outlet 266. The results of the colorimetric examination are recorded on the chart paper of the recorder 108.

The proportioning pump 104 may be of any suitable type though it is preferably of the type described in U.S. Patent No. 2,935,028. Briefly described, the pump comprises the previously mentioned pump tubes which are resiliently flexible and are compressed progressively along their lengths for the pumping operation by the engagement therewith of a plurality of pressure rollers 268 against a platen 270. The pressure rollers are driven by the endless sprocket chains 272 and move longitudinally of the pump tubes to fully close said tubes progressively along their lengths in the direction indicated by arrow 274 and thus propel the liquid and other fluids for transmitting them from sources of supply to points of delivery. It will be apparent that the action of the pressure rollers with respect to pump tube 240 results in aspirating the eluate through outlet 102 of the column.

Since the colorimeter 106 is a well known type and does not, per se, form part of the invention, a further description of the colorimeter is unnecessary.

The variable gradient device 112 is preferably of the type shown and described in the U.S. patent application of Jack Isreeli, Serial No. 60,174, filed October 3, 1960, now Patent No. 3,088,714, and is assigned to the assignee of the present application. Briefly described, the device comprises a series of chambers 276 which are arranged in a circular row and which are in fluid flow communication with each other at their lower ends through the connecting tubing 278. The chambers are identical and they contain eluent of varying compositions in hydrostatic equilibrium. Eluent is removed from a chamber at one end of the series of chambers causing the liquids in each of the other chambers to flow into the succeeding chamber in a continuous fashion, so that the concentration of each liquid in each of the chambers is continuously changing and the concentration of the effluent which is being removed from the last chamber and devlivered to the chromatography column through conduit 114 is also varying in a continous manner.

Continuous chromatography analysis apparatus of the type to which the present invention relates is shown in the U.S. application of Edwin C. Whitehead et al., now Patent No. 3,010,798, issued Nov. 28, 1961, which shows a multipoint recorder and in the U.S. application of Andres Ferrari, now Patent No. 3,074,784, issued Jan. 22, 1963, both assigned to the assignee of my present application. It will be understood that in lieu of a colorimeter with a single flow cell, as shown in said Patent No. 3,010,798, with provision for exposing the liquid under analysis successively to light of different wave lengths, as above stated, the apparatus may have a plurality of flow cells through which the liquid under analysis flows in series and in which the liquid is exposed seriatum to the light of different wave lengths, respectively, as disclosed in said Patent No. 3,074,784.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying ideas or principles of this invention within the scope of the appended claims.

What is claimed is:

1. Chromatography analysis apparatus, comprising a chromatography column, analyzing means, movable valve means for controlling the flow of eluent to said column and other movable valve means for controlling the flow of eluate from said column to said analyzing means for analyzing operation of said apparatus and for controlling the flow of a standard liquid having a known constituent to said analyzing means in lieu of said eluate for standardization operation of said apparatus, coupling means including two rotary solenoids interconnnecting said valve means to each other so that movement of one of said valve means causes a corresponding movement of the other of said valve means, operating means including one of said solenoids associated with one of said valve means for moving both of said valve means in one direction to simultaneously place both of said valve means in position for standardization operation of said apparatus when said one of said solenoids is energized and the other of said solenoids is de-energized, operating means including the other of said solenoids associated with the other of said valve means for moving both of said valve means in another direction, when said one solenoid is de-energized and said other solenoid is energized, to simultaneously place both of said valve means in position for analyzing operation of said apparatus, and means for controlling the operation of each of said operating means.

2. Chromatography analysis apparatus, comprising a chromatography column, analyzing means, rotary valve means for controlling the flow of eluent to said column and other rotary valve means for controlling the flow of eluate from said column to said analyzing means for analyzing operation of said apparatus and for controlling the flow of a standard liquid having a known constituent to said analyzing means in lieu of said eluate for standardization of said apparatus, coupling means including two rotary solenoids interconnecting said valve means to each other so that rotation of either of said valve means causes a corresponding movement of the other of said valve means, one of said rotary solenoids being operatively connected to one of said valve means for the operation thereof, the other of said solenoids being operatively connected to the other of said valve means, means for controlling the operation of said rotary solenoids to energize one of said solenoids and simultaneously rotate both of said valve means in one direction to position said valve means for standardization operation of said apparatus and to energize the other of said solenoids at the end of said standardization operation to simultaneously rotate both of said valve means in the opposite direction and return said valve means to their original positions for analyzing operation of said apparatus, and means operable to de-energize either one of said solenoids when the other one of said solenoids is energized.

3. Chromatography analysis apparatus, comprising a chromatography column, analyzing means, rotary valve means for controlling the flow of eluent to said column and other rotary valve means for controlling the flow of eluate from said column to said analyzing means for analyzing operation of said apparatus and for controlling the flow of a standard liquid having a known constituent to said analyzing means in lieu of said eluate for standardization operation of said apparatus, coupling means including two rotary solenoids interconnecting said valve means to each other so that rotation of either of said valve means causes a corresponding movement of the other of said valve means, one of said rotary solenoids being operatively connected to one of said valve means for the operation thereof, the other of said solenoids being operatively connected to the other of said valve means, switch means associated with each of said solenoids for controlling the energization of the corresponding solenoid and operable in response to the position of the corresponding valve means, and control means operatively connected to said switch means to energize one of said solenoids and simultaneusly rotate both of said valve means in one direction to position said valve means for standardization operation of said apparatus and to energize the other of said solenoids at the end of said standardization operation to simultaneously rotate both of said valve means in the opposite direction and return said valve means to their original positions for analyzing operation of said apparatus.

4. Chromatography analysis apparatus, comprising a chromatography column, analyzing means, rotary valve means for controlling the flow of eluent to said column and other rotary valve means for controlling the flow of eluate from said column to said analyzing means for analyzing operation of said apparatus and for controlling the flow of a standard liquid having a known constituent to said analyzing means in lieu of said eluate for standardization operation of said apparatus, coupling means including two rotary solenoids interconnecting said valve means to each other so that rotation of either of said valve means causes a corresponding movement of the other of said valve means, one of said rotary solenoids being operatively connected to one of said valve means for the operation thereof, the other of said solenoids being operatively connected to the other of said valve means, a normally closed switch for each of said solenoids for controlling the operation thereof, each of said valve means having a switch actuating member, said switches being in the path of movement of the corresponding actuating member and said actuating members being positioned so that said switches are operated in opposition whereby during standardization operation one switch is closed and the other open and during analyzing operation said one switch is open and said other switch is closed, timing means for providing periods of standardization operation and periods of analyzing operation, and circuit means operatively connected to said timing means and said switch means and operable in response to the operation of said timing means to energize one of said solenoids and simultaneously rotate both of said valve means in one direction to position said valve means for standardization operation of said apparatus and to energize the other of said solenoids at the end of said standardization operation to simultaneously rotate both of said valve means in the opposite direction and return said valve means to their original positions for analyzing operation of said apparatus.

5. Apparatus for controlling the flow of liquids, comprising rotary valve means for controlling the flow of one liquid, other rotary valve means for controlling the flow of another liquid, coupling means including two rotary solenoids interconnecting said valve means to each other so that rotation of one of said valve means in one direction from a first position to a second position causes a corresponding rotation of the other to simultaneously position both of said valve means to permit flow of one of said liquids and to prevent flow of the other of said liquids when in said second position, and rotation of the other of said valve means in an opposite direction from said second position back to said first position causes a corresponding rotation of said one valve means to simultaneously position both of said valve means to prevent flow of said one liquid and to permit flow of said other liquid when in said first position, one of said rotary solenoids being operatively connected to one of said valve means for the rotary operation thereof, the other of said rotary solenoids being operatively connected to the other of said valve means, and means operative to permit the energization of one of said solenoids only when in said first position and to permit the energization of the other of said solenoids only when in said second position.

6. Apparatus for controlling the flow of liquids, comprising rotary valve means for controlling the flow of one liquid, other rotary valve means for controlling the flow of another liquid, coupling means interconnecting said valve means to each other so that rotation of one of said valve means in one direction from a first position to a second position causes a corresponding rotation of the other to simultaneously position both of said valve means to permit flow of one of said liquids and to prevent flow of the other of said liquids when in said second position, and rotation of the other of said valve means in an opposite direction from said second position back to said first position causes a corresponding rotation of said one valve means to simultaneously position both of said valve means to prevent flow of said one liquid and to permit flow of said other liquid when in said first position, a rotary solenoid for each of said valve means operatively connected to the corresponding valve means for the rotary operation thereof, and means operative to permit the energization of one of said solenoids only when in said first position and to permit the energization of the other of said solenoids only when in said second position, said last mentioned means including switch means for each of said solenoids operable in response to the rotation of the corresponding valve means.

7. Rotary valve means, comprising a rotary valve rotatable in opposite directions, a rotary solenoid for rotating said valve in one direction and another rotary solenoid for rotating said valve in an opposite direction, means interconnecting said solenoids to said valve for the operation thereof, said interconnecting means having a part spaced from said valve and movable into engagement therewith for rotating said valve in one direction only after initial rotation of one of said solenoids and when the torque of said solenoid has reached a predetermined value which is above the value of the starting torque of said solenoid and having another part spaced from said valve as a result of said rotation of said valve and movable into engagement therewith for rotating said valve back in an opposite direction only after initial rotation of the other of said solenoids and when the torque of said other solenoid has reached a predetermined value which is above the value of the starting torque of said other solenoid.

8. Rotary solenoid apparatus, comprising a rotary member, another rotary member, a rotary solenoid for each of said rotary members operatively connected to the corresponding rotary member, means responsive to the positions of said solenoids for controlling the operation thereof, and means operatively connecting said solenoids to each other so that operation of one of said solenoids causes a corresponding operation of the other of said solenoids and thereby concomitantly operates said rotary members.

9. Rotary solenoid apparatus, comprising a rotary member, another rotary member, a rotary solenoid for each of said rotary members operatively connected to the corresponding rotary member, a switch for each of said solenoids responsive to the position of the corresponding solenoid for controlling the operation of said corresponding solenoid, and coupling means interconnecting said solenoids to each other so that rotation of one of said solenoids from one position causes a corresponding rotation of the other of said solenoids and thereby concomitantly rotates both of said rotary members from said one position to another position, said switches being in opposite operating condition in each of said positions so that one of said solenoids is in condition for operation in one of said positions and the other of said solenoids is in condition for operation in said other position.

10. Rotary solenoid apparatus, comprising a rotary member, another rotary member, a rotary solenoid for each of said rotary members operatively connected to the corresponding rotary member, said solenoids and said rotary members being rotatable in one direction from one position into another position and back in an opposite direction from said other position into said one position, a switch for each of said solenoids responsive to the position of the corresponding solenoid for controlling the operation of said corresponding solenoid, one of said switches being open in said one position and the other of said switches being closed in said one position, and said one switch being closed in said other position and said other switch being open in said other position so that in said one position one of said solenoids is in condition for operation and in said other position the other of said solenoids is in condition for operation, and coupling means interconnecting said solenoids to each other so that energization of said one solenoid causes rotation of said solenoids and said rotary members in one direction from said one position to said other position and energization of said other solenoid in said other position causes rotation of said solenoids and said rotary members in an opposite direction back from said other position to said one position.

References Cited by the Examiner

UNITED STATES PATENTS

| | | | |
|---|---|---|---|
| 746,896 | 12/1903 | Stott | 137—637.1 |
| 1,931,751 | 10/1933 | Brown et al. | 251—76 |
| 1,943,854 | 1/1934 | Beckwith | 251—76 |
| 1,960,843 | 5/1934 | Gilbert | 137—637.1 |
| 2,016,577 | 10/1935 | Pearson | 137—637.1 |
| 2,224,290 | 12/1940 | Corbin | 137—637.1 |
| 2,833,508 | 5/1958 | Bydalek et al. | 251—133 |
| 2,872,154 | 2/1959 | Jones | 251—133 |
| 3,018,224 | 1/1962 | Ferrari | 23—253 X |

FOREIGN PATENTS

| | | |
|---|---|---|
| 24,654 | 1911 | Great Britain. |
| 284,823 | 4/1931 | Italy. |

MORRIS O. WOLK, *Primary Examiner.*

ANTHONY SCIAMANNA, DELBERT E. GANTZ,
*Examiners.*